Figure 1:
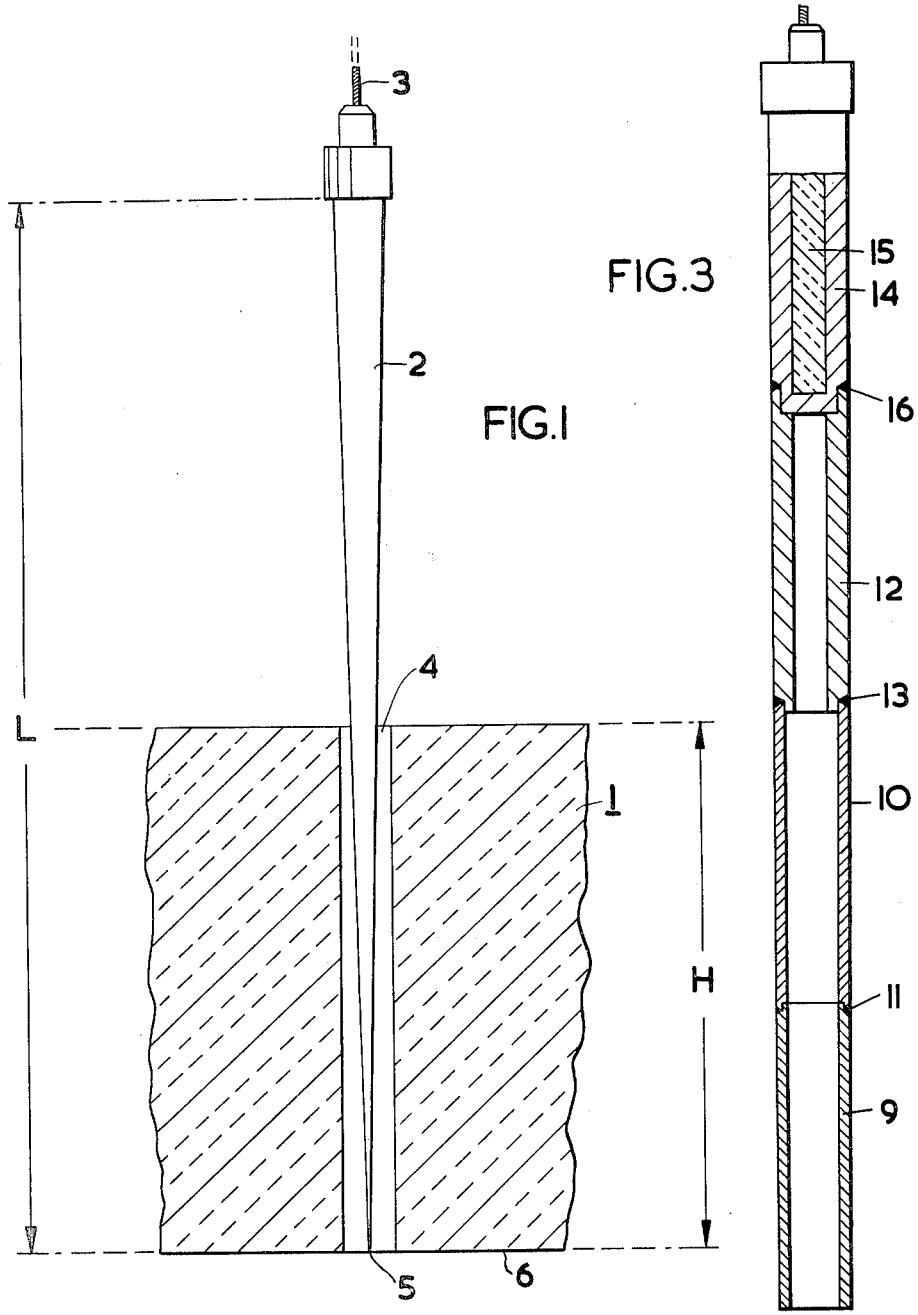

United States Patent Office

3,230,147
Patented Jan. 18, 1966

3,230,147
METHOD AND APPARATUS FOR CONTROLLING REACTIVITY OF NUCLEAR REACTOR
Anthony John Michael Hitchcock, Dorchester, Dorset, England, assignor, by mesne assignments, to the United States of America as represented by the United States Atomic Energy Commission
Filed June 3, 1964, Ser. No. 372,192
2 Claims. (Cl. 176—35)

The present application is a continuation-in-part of my co-pending application Serial No. 847,728, filed October 21, 1959.

This invention relates to control rods for nuclear reactors and is particularly concerned with the control of reactivity in reactors of the type in which the nuclear process is a fission chain reaction produced by neutrons in an assembly of natural or slightly enriched uranium. In general such reactors comprise an assembly of fissionable material disposed in a core structure of moderating material such as graphite which slows neutrons to thermal energies at which they are most efficient to produce fission.

In nuclear reactors the ratio of the fast neutrons produced in one generation by fission to the original number of fast neutrons is a theoretical system of infinite size, where there can be no external loss of neutrons, is called the infinite reproduction or multiplication factor of the system and is usually denoted by the constant K. If K can be made sufficiently greater than unity to indicate a net gain of neutrons in a theoretical system of infinite size, a practical reactor can be built sufficiently large so that this gain is not lost by leakage of neutrons from the periphery of the system. Thus a self sustaining chain reacting system of finite and practical size can be obtained. Control of reactivity in such a reactor is effected in a known method by insertion and withdrawal of control rods of neutron absorbing material into and out of the core structure, the rods having a neutron absorbing characteristic. In general such rods are partially inserted into the reactor core structure during operation of the reactor and are moved to vary their degree of insertion into the reactor core structure so as to control the reactivity of the reactor. The effect of each control rod on reactivity depends upon its degree of insertion into the core structure of the reactor. Since the axial flux distribution in the core structure is of smooth gradation with the control rods inserted there is a smooth gradation of reactivity with the control rods fully withdrawn. However with the control rods partially inserted into the core structure there is a stepwise change of reactivity between that part of the core structure containing the control rods and that part from which the control rods are withdrawn. This state of affairs may be unsatisfactory if instabilities are so provoked in the reactor.

According to the invention a method for controlling the reactivity of a nuclear reactor of the type comprising a core structure containing discrete bodies of fissile material comprises the steps of introducing a series of bodies of non-fissile neutron absorbing material into the core structure of the reactor, said bodies of non-fissile neutron absorbing material being introduced into the reactor core structure in sequence along a line passing through the nuclear reactor core structure, the series of bodies increasing in neutron absorbing capacity from one body to the next in the series beginning with a minimum capacity at the body which is first inserted into the nuclear reactor core structure and ending with a maximum capacity at the body which is last introduced into the reactor core structure, the reactivity of the nuclear reactor being controlled during operation by movement of the series of bodies as a whole into and out of the reactor core structure so that the number of the series bodies contained wholly or partially by the reactor core structure is varied.

In accordance with another aspect of the invention means for carrying out the above method of the invention comprises in a nuclear reactor having at least a partially solid nuclear reactor core structure defining at least one elongate channel extending through a cross section of the core structure, a control rod wholly of non-fissile neutron absorbing material extending in the channel to control the reactivity of the nuclear reactor during operation thereof, and means for inserting the control rod from one end thereof into the channel and moving the control rod longitudinally along the length of the channel during the operation to variably control the reactivity along the said cross section, the control rod comprising a plurality of parts of neutron absorbing material having a total length at least the length of the cross section, the length of each of the parts being at least one quarter the total length of the control rod, the parts being joined end to end to form the rod, the neutron absorbing capacity of the parts increasing from one part to the next beginning with a minimum capacity at the end of insertion of the control rod and ending with a maximum at the other end, and adjacent parts of the control rod having a difference in neutron absorbing capacity insufficient to create a significant zone of stepwise change of reactivity at any point along the cross section of the core structure.

Figure 2:
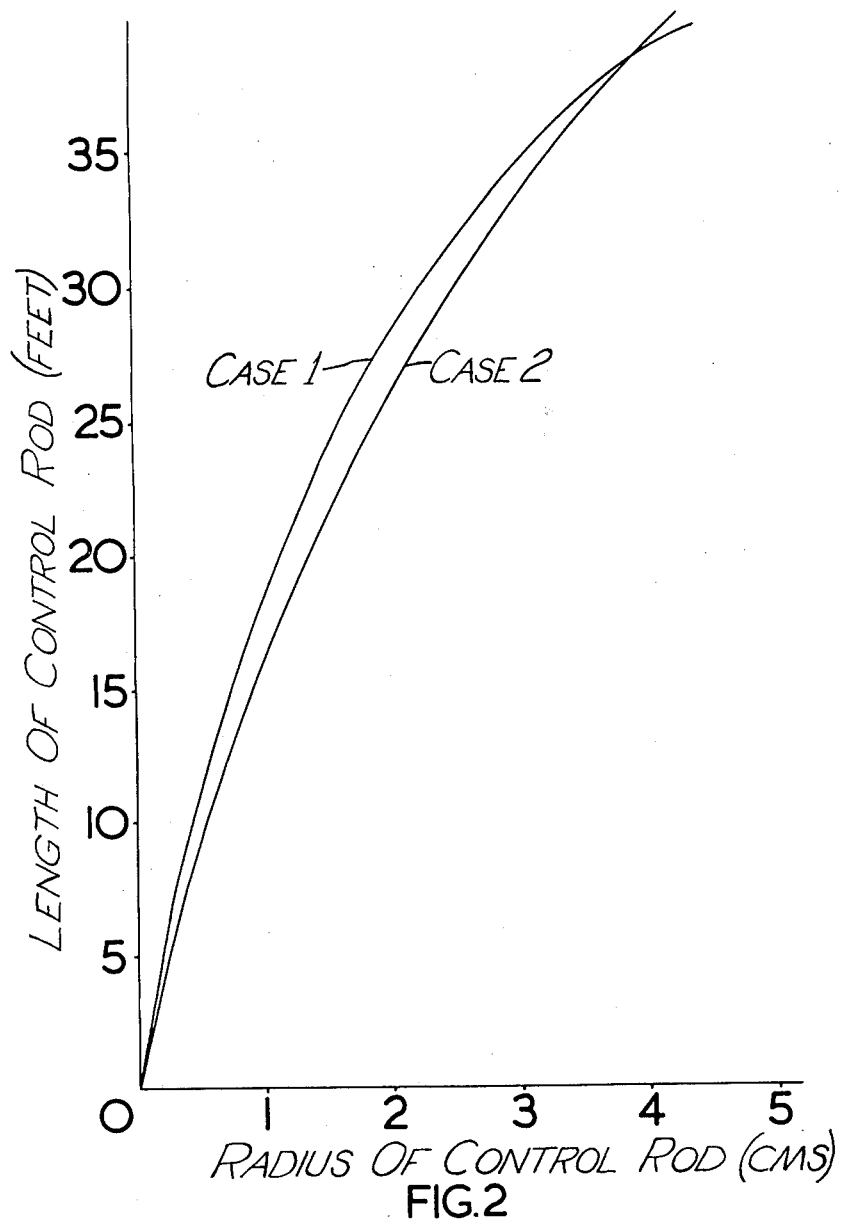

The invention will now be described by way of example with reference to the accompanying drawings in which:

FIGURE 1 is a longitudinal section of part of the core structure of a nuclear reactor, FIGURE 2 is a graph, and FIGURE 3 is a longitudinal sectional view of a control rod in accordance with the invention.

In FIGURE 1 there is shown part of the core structure 1 of a nuclear reactor. A control rod 2 of neutron absorbing material is suspended from a cable 3 and is movable along a vertical control rod channel 4 in the core structure 1. The control rod shown in FIGURE 1 is of idealised tapered form so as to be suitable for carrying out a method in accordance with the invention for controlling the reactivity of a nuclear reactor.

It can be shown mathematically that the ideal shape for a tapered control rod of the above form is approximately in accordance with the formula:

$$\frac{P}{a} + \frac{Q}{x} = \text{Constant}$$

where $a$ = control rod radius
$x$ = distance along the rod measured from the pointed end
$P$ and $Q$ are constants depending on the reactor design and the required control rod performance.

In accordance with the above formula the rod is approximately the shape obtained by rotating a rectangular hyperbola about a chord perpendicular to an assymptote. If while retaining other dimensions it is desired to alter the rate of control of reactivity per foot of insertion of the control rod it is merely necessary to alter the scale of $x$.

Calculations of control rod dimensions and shape have been made in two cases for a reactor having a core structure with the following parameters:

Core radius _____ 600 cm.
Core height _____ 600 cm.
Flattened radius _____ 0.
$L_R^2$ (Radial diffusion area) _____ 429 cm.$^2$.
$L_{SR}^2$ (Radial slowing down area) _____ 507 cm.$^2$.
Control rod channel radius _____ 6 cm.

The results are tabulated below and show graphically in FIGURE 2.

*Case I.*—For a single rod at the centre of the core structure and intended to control 0.25% in reactivity per foot insertion.

| Distance along the rod, (x) feet | 1.0 | 1.8 | 2.7 | 3.7 | 4.5 | 8.2 | 17.2 | 26.4 | 35.7 |
|---|---|---|---|---|---|---|---|---|---|
| Control Rod radius a cms | 0.032 | 0.066 | 0.102 | 0.139 | 0.177 | 0.343 | 0.885 | 1.73 | 3.23 |

*Case II.*—For one of a hundred uniformly distributed rods intended to control .0071% in reactivity per foot insertion.

| Distance along the rod, (x) feet | 1.5 | 5.9 | 13.2 | 22.9 | 28.7 | 35 | 41.7 |
|---|---|---|---|---|---|---|---|
| Control Rod radius a cms | 0.074 | 0.312 | 0.777 | 1.62 | 2.19 | 3.27 | 4.76 |

As can be seen from FIGURE 2 the calculated shapes in the two cases are very similar and this indicates that a sufficient approximation to the desired behaviour can be obtained with any number of rods of the same shape.

FIGURE 3 shows a practical form of control rod constructed to have a tapered effect in accordance with the principle illustrated by the control rod shown in FIGURE 1. The control rod of FIGURE 3 is made in a series of four parts 9, 10, 12 and 14 each having a substantially equal length as shown one quarter the total length of the control rod the neutron absorbing capacity of the parts increasing from one part to the next from a minimum at the part 9 which is first inserted into the reactor core structure, to a maximum at the part 14 which is inserted last into the reactor core structure. The parts 9, 10, 12 and 14 are all of non-fissile material. The lower part 9 is in the form of a thin-walled mild steel tube joined by a circumferential seam weld 11 with the part 10 which is in the form of a thin-walled boron steel tube 10. The part 10 is joined by a circumferential seam weld 13 with the part 12 which is in the form of a thick-walled boron steel tube. The part 12 is joined with the part 14 by a circumferential seam weld 16, the part 14 being in the form of a thick-walled boron steel tube containing an insert of borated graphite 15.

In a method in accordance with the invention using the control rod of FIGURE 3 to control reactivity in a nuclear reactor, the control rod is moved into and out of a channel passing through the core structure of the nuclear reactor so that the series of parts 9, 10, 12 and 14 of the rod are moved in sequence into and out of the core structure of the reactor whereby the number of the parts contained wholly or partially by the core structure of the reactor during operation thereof is varied to effect control of the reactivity of the nuclear reactor.

I claim:

1. A method of controlling a nuclear reactor of the type comprising a core structure containing discrete bodies of fissile material comprising the steps of introducing a series of bodies of non-fissile neutron absorbing material into the core structure of the reactor said bodies of non-fissile neutron absorbing material being introduced into the reactor core structure in sequence along a line passing through the nuclear reactor core structure the series of bodies increasing in neutron absorbing capacity from one body to the next in the series beginning with a minimum capacity at the body which is first inserted into the nuclear reactor core structure and ending at a maximum capacity at the body which is last introduced into the reactor core structure, the nuclear reactor being controlled during operation by movement of the series of bodies as a whole into and out of the reactor core structure so that the number of the series of bodies contained wholly or partially by the reactor core structure is varied.

2. In a nuclear reactor having a nuclear reactor core structure defining at least one elongate channel extending through a cross section of the core structure, a control rod wholly of non-fissile neutron absorbing material extending in the channel to control the reactivity of the nuclear reactor during operation thereof, and means for inserting the control rod from one end thereof into the channel and moving the control rod longitudinally along the length of the channel during the operation to variably control the reactivity along the said cross section, the control rod comprising a plurality of parts of neutron absorbing material having a total length at least the length of the cross section, the length of each of the parts being at least of substantially equal length, the parts being joined end to end to form the rod, the neutron absorbing capacity of the parts increasing from one part to the next beginning with a minimum capacity at the end of insertion of the control rod and ending with a maximum at the other end, and adjacent parts of the control rod having a difference in neutron absorbing capacity insufficient to create a significant zone of stepwise change of reactivity at any point along the cross section of the core structure.

References Cited by the Examiner

UNITED STATES PATENTS 2,852,456  9/1958  Wade _____ 176—86
3,103,479  9/1963  Ronsohoff _____ 176—86

FOREIGN PATENTS 223,903  11/1957  Australia.
205,614  10/1959  Austria.
926,133  5/1963  Great Britain.

OTHER REFERENCES

Schultz: "Control of Nuclear Reactors and Power Plants," 1955, pp. 20, 98–104, pub. by McGraw-Hill.

Nucleonics: vol. 16, No. 3, March 1958, pp. 87–89, by Davis et al.

LEON D. ROSDOL, *Primary Examiner.*

REUBEN EPSTEIN, *Examiner.*

M. R. DINNIN, *Assistant Examiner.*